United States Patent [19]

Brewer

[11] Patent Number: 4,867,048
[45] Date of Patent: Sep. 19, 1989

[54] CONVERTIBLE BEVERAGE BREWER
[75] Inventor: Alan W. Brewer, Divernon, Ill.
[73] Assignee: Bunn-O-Matic Corp., Springfield, Ill.
[21] Appl. No.: 309,476
[22] Filed: Feb. 13, 1989
[51] Int. Cl.[4] .......................................... A47J 31/00
[52] U.S. Cl. ...................................... 99/283; 99/295; 99/302 R; 99/307
[58] Field of Search ................. 99/279, 280, 281, 282, 99/283, 284, 290, 295, 299, 300, 302 R, 304, 307; 426/433

[56] References Cited

U.S. PATENT DOCUMENTS

| | | | |
|---|---|---|---|
| 3,336,856 | 8/1967 | Martin | 99/288 |
| 3,385,201 | 5/1968 | Martin | 99/282 |
| 3,494,276 | 2/1970 | Martin | 99/282 |
| 4,413,552 | 11/1983 | Daugherty | 99/295 |
| 4,464,981 | 8/1984 | Stover | 99/280 |
| 4,478,139 | 10/1984 | Zimmeman | 99/280 |
| 4,503,757 | 3/1985 | Daugherty | 99/295 |

Primary Examiner—Robert W. Jenkins

[57] ABSTRACT

A convertible beverage (coffee and tea) making machine which as manufactured is a manual cold water pour-in machine and which is readily convertible "in the field" to an automatic cold water inlet machine, with or without a separate hot water faucet, by installing the contents of a conversion kit. If desired, the machine can be re-converted from an automatic back to a manual cold water pour-in machine. Separate and apart from being convertible from pour-in to automatic, the beverage making machine incorporates structural features which readily permit the following optional changes: the brewing funnel support rails can be re-positioned to allow the brewing funnel to be inserted and withdrawn from either the right or left side instead of from the front; the electric switch "buttons" can be re-positioned from the front to either the right or left sides; and, a hot water faucet, when added, can be mounted on either the right or left sides.

11 Claims, 5 Drawing Sheets

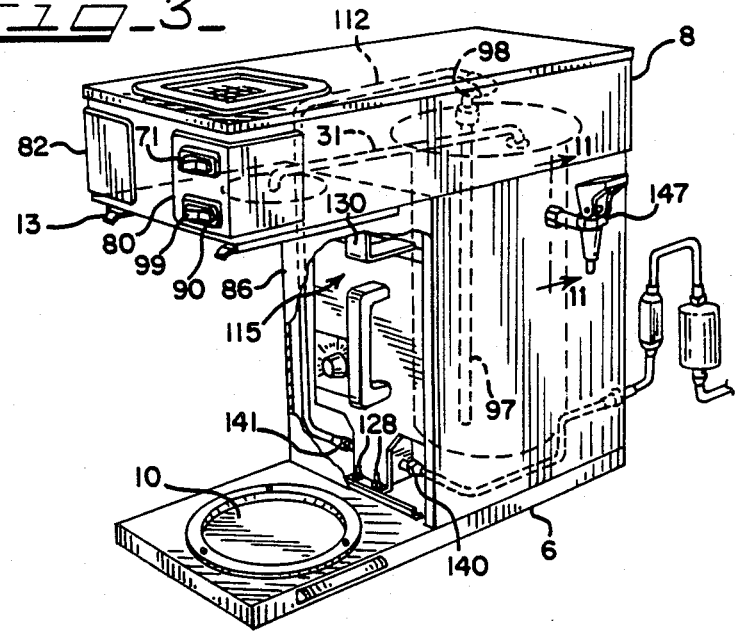
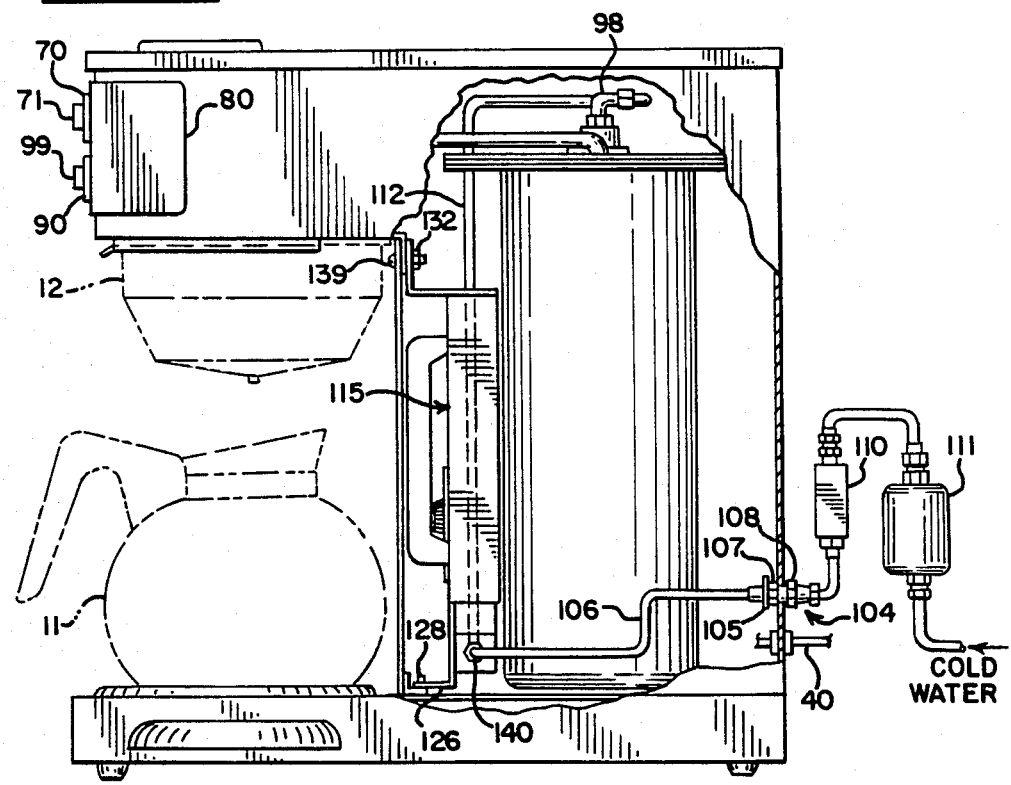

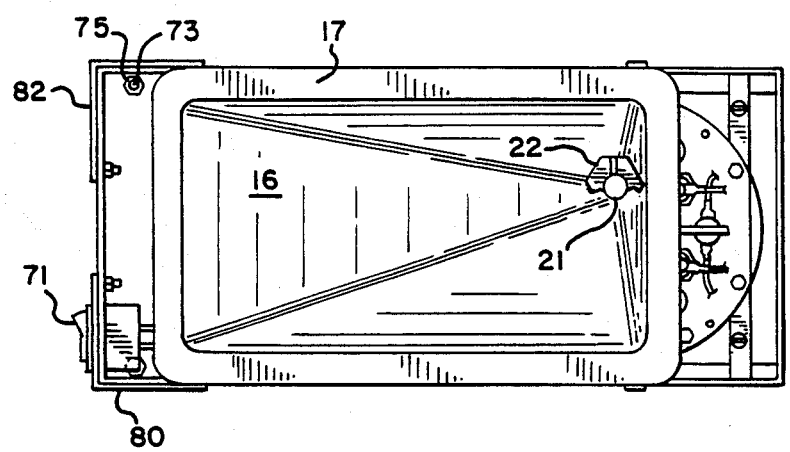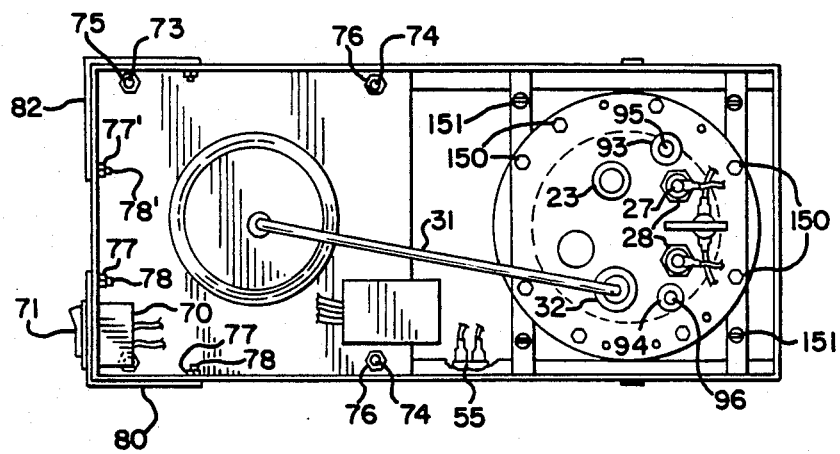

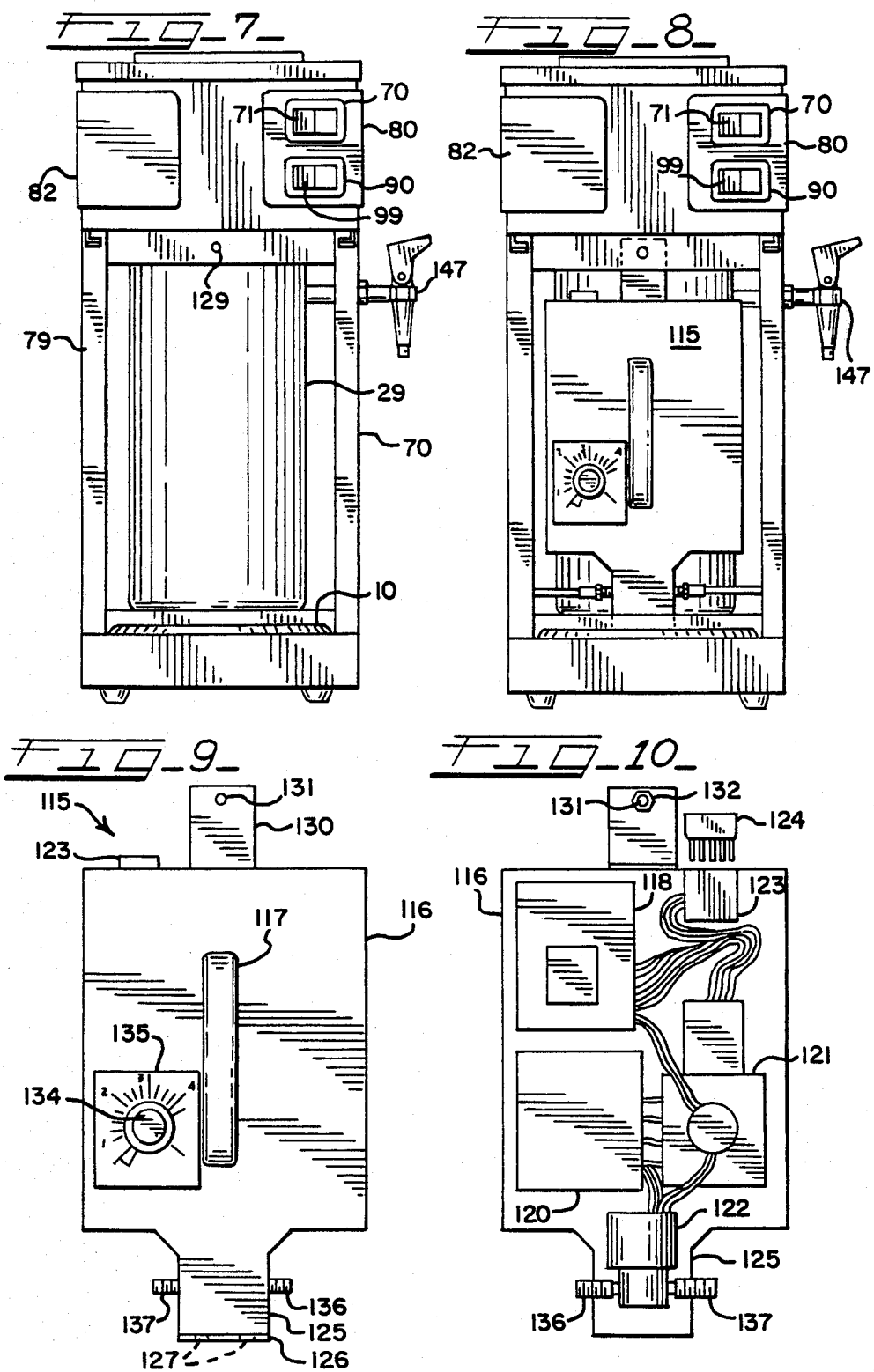

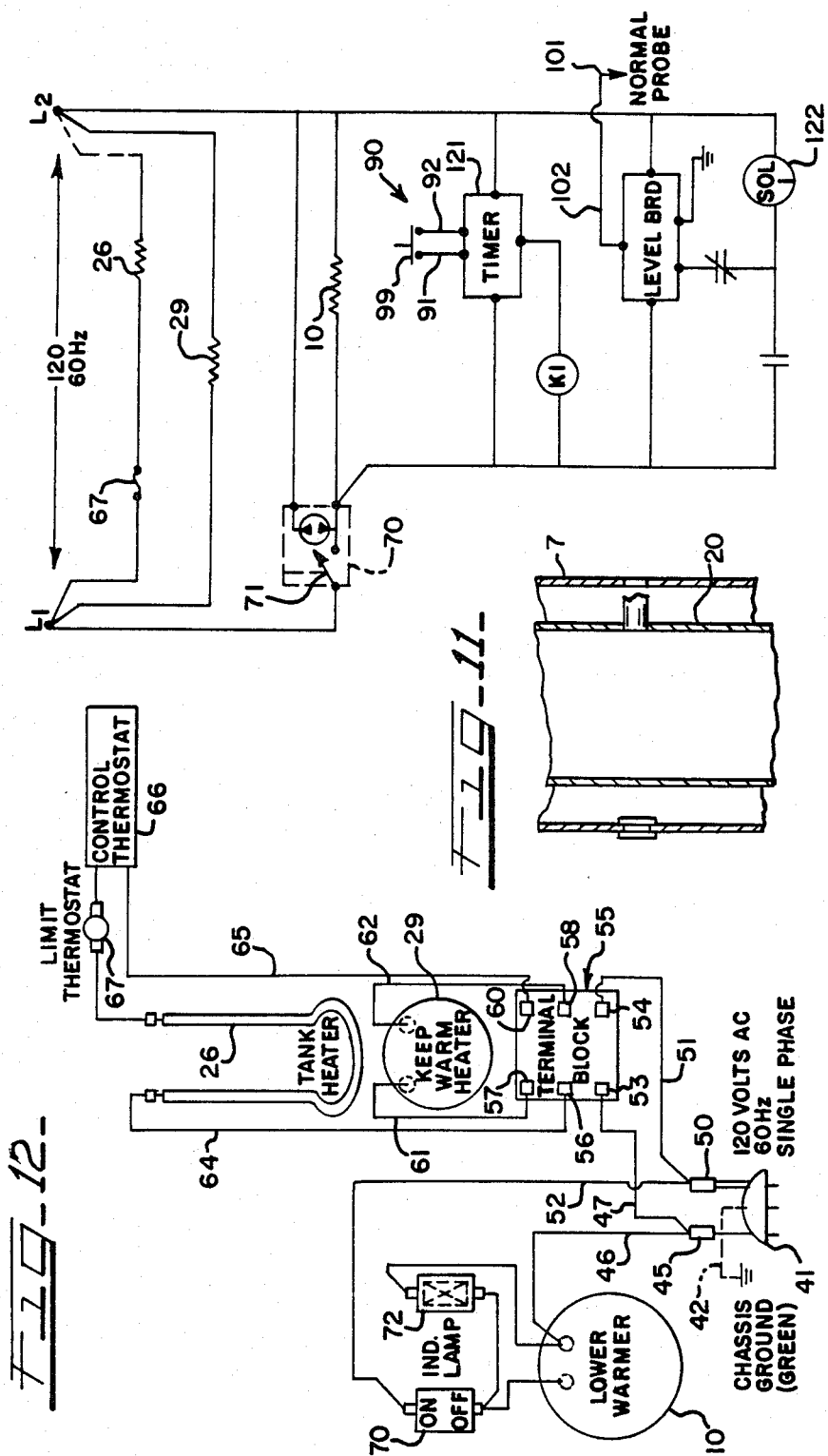

CONVERTIBLE BEVERAGE BREWER

This invention relates generally to innovations and improvements in beverage (i.e. coffee or tea) making machines characterized by being convertible in a number of respects, including: (1) from a cold water pour-in machine to a pour-in and automatic machine; (2) from being operable from the front of the machine to being operable from either the left side or the right side; and (3) from having no hot water draw-off faucet to having a hot water draw-off faucet which can be mounted on either side of the machine. The beverage making machines of the present invention are characterized by having a hot water reservoir in which a supply of hot water is maintained and which is displaced by introduction of cold water in the beverage brewing operation.

Beverage making machines of the hot water supply tank type which operate manually by pouring in col water are known in the prior art and are shown and described, for example, in the following U.S. Pat. Nos.: Martin 3,320,334 dated Nov. 11, 1965; Martin 3,336, 856 dated Aug. 22 1967; Martin 3,385,201 dated May 28, 1968; Martin 3,494,276 dated Feb. 10, 1970; Martin 3,736,155 dated May 29, 1973; Daugherty 4,413,552 dated Nov. 8, 1983; and Daugherty 4,503,757 dated March 12, 1985. Likewise, beverage making machines of the hot water supply type are known in the prior art wherein cold water is fed automatically by operation of a starter switch. These latter machines are referred to in the art as "automatics" and are shown and described, for example, in the following U.S. Pat. Nos: Bunn Re. 25,663 dated Oct. 13, 1964; Martin 3,691,933 dated Sept. 19, 1972; and Martin 3,793,934 dated Feb. 26, 1974. In addition, beverage making machines of the hot supply tank type are also known which are capable of being operated either manually by pouring in cold water or automatically by depressing a starter switch. Such beverage making machines are shown and described, for example, in the following U.S. Pat. Nos.: Martin 4,094,233 dated June 13, 1978; and Stover 4,464,981 dated Aug. 14, 1984.

The present invention relates to a beverage making machine which as originally manufactured and shipped will, generally, be constructed and operable only as a manual pour-in machine with the capability of being readily converted from a front operating machine to one that operates from either the left or right side. A conversion kit will be available which upon installation converts the machine to one that operates either as a pour in or as an automatic. The kit preferably includes a faucet and level control probe whereby the machine will have a hot water faucet mounted either on the left side or right side, as desired.

The object of the invention, generally stated, is the provision of a beverage making machine of the type having a hot water supply tank or reservoir constructed with a cold water basin so as to be operable as a pour-in machine and which has a structure which permits the installation of components of a kit which convert the machine to an automatic machine.

An important object of the invention is the provision of a beverage making machine of the hot water reservoir type which incorporates features that permit it to be readily and conveniently changed from a front operating machine to one that is operable from either side.

Another important object of the invention is the provision of a beverage making machine of the hot water reservoir type on which a hot water draw-off faucet may be added on either one side or the other, as desired.

Certain other objects of the invention will be apparent to those skilled in the art in view of the following detailed description of presently preferred embodiments of the invention taken with the accompanying drawings, in which:

FIG. 3 is a view corresponding to FIG. 1 showing the machine after addition thereto of components which convert the beverage making machine of FIG. 1 to one that operates either as a cold water pour-in or as an automatic machine and which has a hot water faucet;

FIG. 4 is a side elevational view of the machine shown in FIG. 3 partly broken away and with certain parts omitted;

FIG. 5 is a top plan view of the beverage making machine of FIG. 1 with its top cover removed;

FIG. 6 is a top plan view similar to FIG. 5 but with the cold water basin of the machine removed;

FIG. 7 is a front elevational view of the machine shown in FIGS. 1 and 2 with the front panel removed;

FIG. 8 is a front elevational view of the machine shown in FIGS. 3 and 4 with the front panel removed;

FIG. 9 is an elevational view showing the front side of a component assembly unit used in converting the pour-in machine of FIGS. 1 and 2 to the pour-in/automatic machine of FIGS. 3 and 4;

FIG. 10 is an elevational view of the reverse side of the unit shown in FIG. 9;

FIG. 11 is a fragmentary vertical sectional detail view taken on line 11—11 of FIG. 1;

FIG. 12 is a simplified diagram of the electrical circuits of the brewing machine of FIGS. 1 and 2; and FIG. 13 is a simplified diagram of the electrical circuits of the brewing machine of FIGS. 3 and 4.

Figure 1:
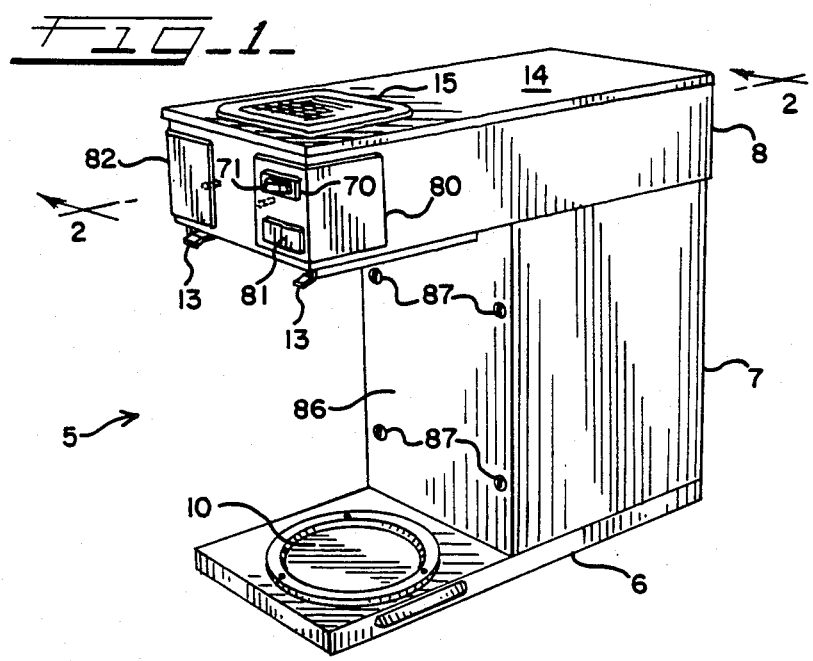
FIG. 1 is a perspective view from the front and right side of a beverage making machine embodying the present invention.
Figure 2:
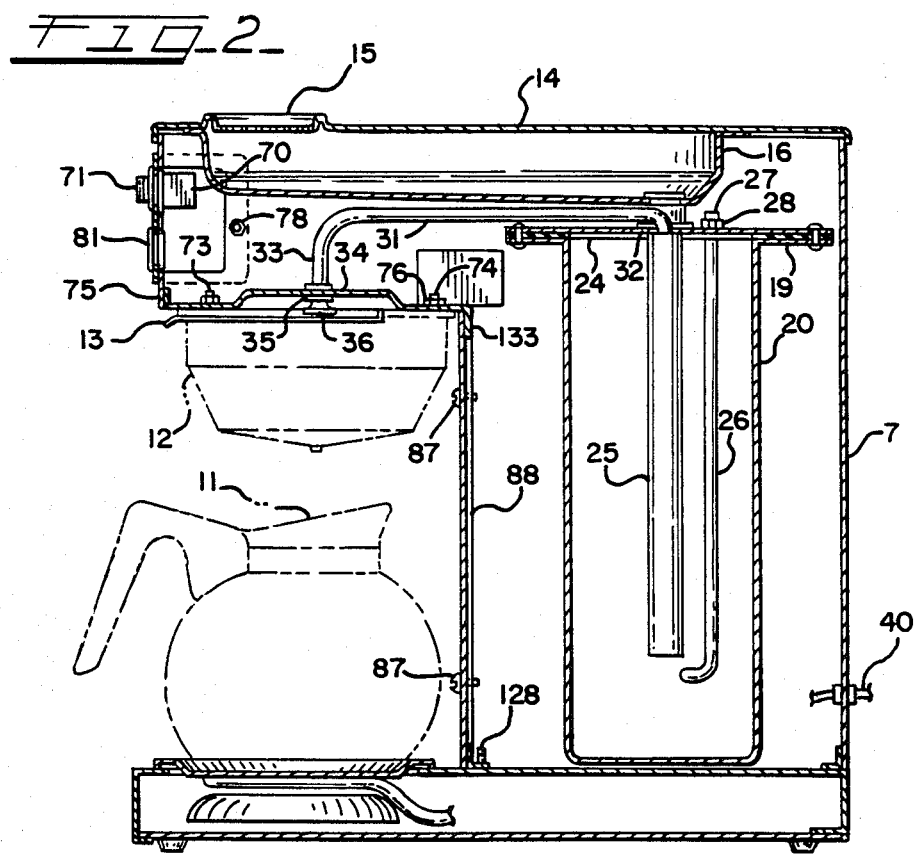
FIG. 2 is a vertical sectional view taken generally on line 2—2 of FIG. 1 showing certain parts in elevation, with certain parts being omitted and with a brewing funnel and beaker shown in phantom.

Referring to FIGS. 1 and 2, a beverage brewing machine is indicated generally at 5 having an outer body or housing which comprises a base 6 and an upstanding hot water tank housing or trunk 7 mounted on the rear portion of the base 6, and an upper housing 8 mounted on the trunk or housing 7. The front portion of the upper housing 8 overhangs the front portion of the base 6 with the latter being equipped with a beaker warmer 10. A beaker or carafe 11 (FIG. 22) is shown in broken line resting on the warmer 10 and a brewing funnel 12 is shown supported from a pair of rails 13—13 from the underside of the overhanging portion of the upper housing 8.

The machine 5 has a removable top cover 14 which at its front end has a screen-equipped cold water pour-in opening 15 which will ordinarily be provided with a removable cover (not shown). A cold water basin 16 is mounted within the upper housing 8 being provided with a horizontal support flange 17 (FIG. 5) which engages and rests on the upper edges on opposite sides of the housing 8. The bottom or floor 18 of the basin 16 is inclined downwardly from its front end which is directly underneath the cold water pour-in opening 15 to its rear end which is directly over a hot water supply tank or reservoir 20. The deep or rear end of the cold water basin 18 is provided with a drain opening 21

(FIG. 5) which receives an inlet fitting nut 22 having a hex nut formation at the top and a threaded extension which projects through the drain hole 21 and which screws into an internally threaded collar 23 (FIG. 6) integrally formed on the cover or lid 24 for the tank or reservoir 20. A cold water fill tube 25 is secured by welding or otherwise to the underside of the cover 24 directly under the integral collar 23 so that cold water in the basin 18 flows downwardly through the tube 25 and discharges into the bottom portion of the tank 20.

An electrical heater element 26 (Calrod heater) is suspended from the underside of the cover 24 into the tank 20 so as to supply heat to the water within the tank or reservoir 20. The upper ends 27—27 (FIG. 6) of the two vertical branches of the heater 26 are threaded and project upwardly through openings in the cover 24. Nuts 28—28 are tightened down over the protruding threaded ends 27 so as to secure the heater 26 firmly in place. Preferably, the tank 20 is provided on the exterior with a blanket or jacket heater 29 (FIG. 7). The function and relationship between the blanket heater 29 and the tank heater 26 are set forth in above-mentioned U.S. Pat. No. 3,736,155, the disclosure of which is incorporated by reference herein.

When hot water is displaced from the upper end or top of the reservoir 20 upon the introduction of cold water into the bottom, the hot water flows upwardly through the downturned end 30 of a siphon tube 31. The downturned end 30 is secured firmly in place on the cover 24 by means of a removable disk 32. The downturned distal or discharge end 33 of the siphon tube 31 extends through an opening in the panel 34 enclosing the underside of the overhang portion of the upper housing 8. The end of the siphon tube 31 which projects through the opening in the panel 34 is threaded so as to receive a lock nut 35 which anchors the downturned end 33 to the panel 34. A hot water spray head 36 of known type is screwed on to the threaded end of the siphon tube 31.

The construction of the beverage brewing machine 5 as thus far described is generally known in the prior art and shown and disclosed for example in the above-mentioned U.S. Pat. Nos. 3,385,201; 3,494,276; and 4,503,757, the disclosures of which are incorporated herein by reference. In operation, when a batch of cold water is poured through the opening 15 into the basin 18, it will discharge by gravity from the bottom of the cold water fill tube 25. The tank or reservoir 20 will have already been filled and the water allowed to become heated to the desired beverage making temperature. The cold water discharging from the tube 25 will displace upwardly without appreciable mixing the hot water from the upper end of the upper tank 20 outwardly through the siphon tube 31. Since the spray head 36 is at a level beneath the inlet end 30 of the siphon tube 31, the residual hot water in the siphon tube 31 will drain by siphon action after hot water has stopped entering the siphon tube from the tank 20. As is well known, before cold water is introduced into the basin 16 a paper filter will have been inserted into the brewing funnel 12 and quantity of ground coffee or tea leaves will have been placed on the filter. The carafe or beaker 11 will also have been placed on the warmer 10. Hot water sprays from the spray head 36 onto the coffee or tea thereby producing a brewing action with the resultant brewed coffee or tea discharging from the funnel into the beaker 11.

The electrical circuit for the beverage making machine 5 of FIGS. 1 and 2 is shown in simplified form in FIG. 12. Projecting from the rear panel or wall of the trunk or housing 7 is a conventional electrical conductor cord 40 (FIG. 2) the free end of which has a conventional three-prong plug 41 for plugging into a wall socket or other source of 120 volt alternating current (60 Hz). The conductor cord 40 provides three conductors, one being a ground 42, a second being a neutral conductor 43 and the third being a "hot" conductor 44. The neutral conductor 43 extends to a junction 45 where it divides into two neutral conductors 46 and 47. Similarly, the "hot" conductor 44 extends to a junction 50 where it divides into two conductors 51 and 52. The neutral conductor 47 and hot conductor 51 are connected with terminals 53 and 54 mounted on a terminal block 55 (FIGS. 6 and 12). Terminal 53 is interconnected with terminals 56 and 57 while terminal 54 is interconnected with terminals 58 and 60. The pair of terminals 56 and 58 are interconnected by means of conductors 61 and 62 to the terminals of the keep-warm blanket 29 of known type which will be wrapped around the mid-body of the tank or reservoir 20. The terminals 57 and 60 are interconnected by conductors 64 and 65 to the terminals of the tank heater 26. The conductor 65 is connected in series with a control thermostat 66 (FIGS. 6 and 12) and a limit thermostat 67. It will be seen that when the wall plug 41 is connected to a socket that the circuits to the keep-warm blanket 63 and tank heater 26 will be energized. If desired, a on-off switch could be located in the conductor 44.

The conductors 46 and 52 are connected to the terminals of the warmer 10. An on-off switch 70 (FIGS. 2 and 12) is located in the conductor 52 and is operable by a button 71 (FIGS. 1 and 2) on the front of the upper housing 8. The button 71 also incorporates a indicator lamp 72, the terminals of which are suitably connected to the conductors 46 and 52.

The funnel support rails 13—13 are identical except for being left handed and right handed. Each rail is supported underneath the panel 34 by means of a pair of weld studs 73 and 74 (FIGS. 2 and 6) which project upwardly from each railing through openings in the panel 34 and which are secured in place by nuts 75 and 76.

Normally, the beverage making machine 5 will be originally set up so as to be operable from the front. Thus, the rails 13 in FIGS. 1–4 are aligned in a front-to-rear direction so that the brewing funnel 12 is inserted and removed from the front of the machine. The switch 70 and its operating button 71 will also be mounted at the front as shown in FIGS. 1–4. Situations may arise wherein it is either inconvenient, difficult, or impossible to operate the brewing machine 5 from the front. For example, there may be no room, or insufficient room, to insert the brewing funnel 12 from the front. However, by relocating the rails 13 and the switch 70, it will be possible to operate the brewing machine 5 from either the left hand side or the right hand side, as desired.

The repositioning or realignment of the funnel support rails 13 to permit the brewing funnel 12 to be inserted from either the left or right side may be readily accomplished by removing each pair of nuts 75–76 which retain each rail 13 in place and then remount the rails so that they extend transversely with their inlet ends on the left or right, as desired. The holes in the panel 34 which accommodate the weld studs 73, 74 of the rails 13 are positioned on the corners of a square so as to permit such repositioning of the rails as described.

In the event it is desired to have the funnel 12 inserted from the right hand side of the machine 5 as viewed from FIG. 1, the on-off warmer switch 70 and its manual operating button 71 can readily be switched to the right hand side by removing the two nuts 77—77 which hold the weld studs 78—78 in place. These weld studs 78 extend inwardly from the right angle member 80. Once the nuts 77 have been removed, the member 80 is removed from the corner of the upper housing 8 and rotated either clockwise or counterclockwise 180° and then replaced on the same corner of the upper housing 8. The nuts 77 are then replaced and turned down on the weld threads so as to secure the angle member 80 in its new position By providing the angle member 80 with a second window, provision is made for mounting a second switch on the angle member. Until such time as there is a need for adding the second switch, the second opening in the angle member 80 may be closed by a readily removable blank 81 (FIGS. 1 and 2).

If it becomes desirable to realign the support rails 13 so that the brewing funnel 12 can be inserted and withdrawn from the left hand side of the unit 5, then in addition to switching the rails it will be necessary to remove the angle member 80 and interchange it with the plain or blank angle member 82. The angle member 82 will have its own pair of weld studs 78 and its own retaining nuts 77.

After the beverage making machine 5 has been operated as a pour-in unit there may arise a requirement to convert the unit to an 'automatic' beverage making machine. This conversion can be readily accomplished by installing parts from a kit provided for conversion purposes. The content of the kit and the manner in which it is installed will now be described in connection with FIGS. 3–11. After the connector plug 41 has first been unplugged, the top lid 14 of the brewer 5 is removed and the lock nut 35 and spray head 36 are removed freeing the distal end 33 of the siphon tube 31. Next, the brewer 5 is tilted forwardly and downwardly to allow most of the water in the reservoir 20 to drain out through the discharge end of the siphon tube 31. The brewer is then returned to its normal position so as to rest on the base 6. The cold water fill basin 18 is removed by unscrewing the inlet fitting nut 22 from the collar 23. The front panel 86 of the trunk 7 is removed by removing the four screws 87 which pass through openings in the panel 86 and screw into the in-turned edges 88 extending along the opposite vertical edges 79 (FIG. 7) of the opening left when the panel 86 is removed.

With the cold water basin 18 having been removed there is ready access from the interior of the upper compartment 8 for permitting removal of the switch blank 81 and the replacement thereof with a starter switch 90 (FIGS. 3 and 13). The brewer 5 is pre-wired with conductors 91 and 92 (FIG. 13) which have unconnected terminals in the upper compartment 8 available to be connected to the starter switch 90 having a starter button 99 (FIG. 4).

The tank lid 24 has two openings provided with rubber grommets 93 and 94 (FIG. 6) which come temporarily closed by removable plugs 95 and 96, respectively. Plug 95 is removed and a cold water inlet tube 97 (FIG. 3) is inserted, the upper end of which slides into an elbow fitting 98 and is secured in fluid-tight connection thereto by a flare fitting 100 which screws onto the elbow 98.

Either before or after the cold water inlet tube 97 is installed, the temporary plug 96 (FIG. 6) is removed and a liquid level probe 101 (FIG. 13) is inserted through the grommet 94 and the unconnected terminal of the conductor 102 for the probe which is available in the upper compartment 8 is connected to the stud at the top of the probe.

The rubber plug 103 (FIG. 2) is removed from the rear wall of the trunk 7 so as to provide an opening for insertion of the shorter end of a bulk head fitting 104 (FIG. 4). The flare fitting 105 on one end of tube 106 is screwed onto the end of the fitting 104 that projects on inside the rear wall of the trunk 7.

With the hex nut 107 which forms an integral part of the fitting 104 abutting the inside surface of the rear wall, the clamping nut 108 is screwed onto the outwardly projecting end of the fitting 104 and drawn up tight against the outer surface of the rear wall thereby securing the fitting 104 firmly in place. The connection of the brewer 5 to a source of cold water under pressure is completed by installing a flow controller 110 and strainer 111 of known type with suitable fittings as shown (FIGS. 3 and 4).

A solenoid valve to tank tube 112 (FIG. 4) is inserted from the above the tank lid or cover 24 into the trunk 7 and its upper horizontal end with the flare fitting 113 is connected to the horizontal leg of the elbow fitting 98 as shown in FIGS. 3 and 4.

With the foregoing installations having been made on the brewer 5, it is now ready to have installed a self-contained component assembly unit which is indicated generally at 115 (FIGS. 3, 4, 9 and 10). The component assembly unit 115 comprises a rectangular support frame 116 provided with a handle 117 on its front outer side. Mounted on the interior of support frame 116 are circuit boards 118 and 120, a timer 121 and a solenoid valve 122. A multi-terminal socket 123 is mounted in an opening in the top of the support frame 116 for receiving the multi-terminal plug 124 (FIG. 10) to complete the necessary electrical connections required to operate the brewer 5 in its automatic mode.

The frame or support 116 is provided at the bottom with a rectangle bracket 125, the lower horizontal leg 126 of which is provided with two apertures 127 (FIG. 9) which allow the leg 126 to fit over a pair of vertical studs 128 (FIG. 4) which project upwardly from the top of the base 6.

At the top, the support frame 116 carries an angular bracket 130, the upstanding leg of which is provided with an aperture 131 (FIGS. 9 and 10). A weld nut 132 is secured to the inner side of upstanding leg in alignment with the aperture 131. A vertical flange 133 (FIG. 2) on the underside of the panel 34 is provided with an aperture 129 (FIG. 7) for receiving a screw 139 which upon insertion and threading into the nut 132 secures the bracket 130 in place.

It will be seen that the unit 115 can be readily ( installed upon the removal of the front panel 86 by inserting the unit so that the horizontal flange 126 fits down over the pins 128. Then the top of the 115 unit is tilted forward (i.e. toward the outside or front) by means of the handle 117 and the screw 139 inserted and tightened in the locknut 132.

It is usually more convenient to insert the male plug 124 into the socket 123 before the unit 115 is secured in place.

An operating knob 134 (FIG. 9) is mounted on the exterior front of the unit 115 for setting the adjustable timer 121. A plate 135 is attached to the front of the support 116 underneath the knob 134 and is suitably graduated from 0.5 to 5 minutes.

The solenoid actuated flow control valve 122 has an inlet nipple 136 and an outlet nipple 137. With the unit 115 installed the flare fitting 140 on cold water inlet tube 106 is connected to the nipple 136 and the flare fitting 141 on the lower end of the cold water inlet tube 112 is connected to the nipple 137. When these connections have been completed, the unit 5 is ready to be operated in its automatic mode in respect to carrying out the brewing cycle.

In order for the brewer 5 to have the ability to dispense hot water independently of its brewing cycle, the sidewall of the reservoir or tank 20 is provided with a threaded outlet port 142 (FIG. 11) adjacent but below the top thereof and into which is screwed a nipple 143. The opposite sides of the trunk housing 7 are provided with apertures 144—144 with which the outer end of the nipple 143 may be aligned when the reservoir is positioned so that the port 142 faces the left side or the right side of the brewer 5. One of the openings 144 will be closed by a readily insertable and removable resilient plug 145 while the other will be closed by a plug 146 (FIG. 1) which screws into and closes the nipple 143. Upon the removal of the plug 146 by means of a wrench, a faucet 147 (FIG. 3) of known type may be inserted.

While the faucet 147 is shown mounted on the right hand side of the brewer 5, it will be understood that the faucet may be mounted on the left hand side by rotating the reservoir 20 180°. The resilient plug 145 will then be inserted in the opening 144 on the right hand side of the brewer and the faucet 147 will be screwed into the nipple 143 which is now aligned with the opening 144 on the left hand side of the brewer. If it is desired to rotate the reservoir 20 from one side to the other, this should be done before the brewer 5 is converted to its automatic mode. If the faucet 147 has already been installed (as in FIG. 3), it is removed and the open hole 144 left by removal of the faucet is closed by removing the plug 145 from the opposite side and inserting it into the opening previously occupied by the faucet.

The spray head 36 and the siphon tube retaining nut 35 are removed. Thereafter the tank lid or cover 24 is disconnected from the tank 20 by removing the nuts 150—150 which fasten the cover or lid 124 to the tank flange 19. Then the four screws 151—151 are removed which secure the tank flange 19 to the upper housing 8. With these connections having been temporarily been removed, the tank 20 can be manually rotated 180°. Thereafter, the tank flange 19 is secured in place by replacing the screws 151 and the tank lid 24 is secured to the tank flange by replacing the nuts 150. With the tank having been thus rotated 180°, the faucet 147 can now be installed on the left side of the brewer 5.

What is claimed is:

1. In apparatus for brewing coffee or tea and having a body which includes, a base which incorporates a beverage beaker warmer, an upstanding hot water tank housing mounted on said base, and an upper housing mounted on said upstanding housing and a portion of which overhangs said warmer and a beaker when placed thereon and having a removable housing cover;

brewing funnel support means exteriorly mounted on the underside of said overhanging portion of said upper housing;

a hot water tank housed for the most part within said upstanding hot water tank housing;

a cold water inlet tube projecting downwardly into said hot water tank;

an electrically energized immersible heating element disposed in said hot water tank;

a hot water discharge tube disposed for the most part within said upper housing and mounted in cantilever fashion on said hot water tank with its proximal and hot water inlet end communicating with the upper portion of said tank and with its distal and hot water discharge end protruding from the underside of said overhanging portion of said upper housing;

a spray head mounted on said protruding discharge end of said hot water discharge tube for spraying hot water in a brewing funnel when disposed on said brewing funnel support means; and an electrical connector cord for electrically energizing said apparatus from a power source and one end of which carries a connector plug and the other end of which extends into said body and provides a pair of electrically energizable conductors therein;

the improvement which comprises said funnel support means being orientable whereby a brewing funnel may be inserted from the front of said apparatus or from either side depending on the orientation of said support means.

2. The improvement of claim 2, wherein said funnel support means comprise a pair of rails on and between which the flange on a brewing funnel are received.

3. In apparatus for brewing coffee or tea and having a body which includes, a base which incorporate an electrical beverage beaker warmer, an upstanding hot water tank housing mounted on said base, and an upper housing mounted on said upstanding housing and a portion of which overhangs, said warmer and a beaker when placed thereon and having a removable housing cover;

brewing funnel support means exteriorly mounted on the underside of said overhanging portion of said upper housing;

a hot water tank housed for the most part within said upstanding hot water tank housing;

a cold water inlet tube projecting downwardly into said hot water tank;

an electrically energized immersible heating element disposed in said hot water tank;

a hot water discharge tube disposed for the most part within said upper housing and mounted in cantilever fashion on said hot water tank with its proximal and hot water inlet end communicating with the upper portion of said tank and with its distal and hot water discharge end protruding from the underside of said overhanging portion of said upper housing;

a spray head mounted on said protruding discharge end of said hot water discharge tube for spraying hot water into a brewing funnel when disposed on said brewing funnel support means; and an electrical connector cord for electrically energizing said apparatus from a power source and one end of which carries a connector plug and the other end of which extends into said body and provides a pair of electrically energizable conductors therein;

the improvement which comprises an on-off switch connected in circuit control relationship with said beverage beaker warmer, said overhang portion of said upper housing having two exposed vertical corners, and means for selectively mounting said on-off switch on opposite sides of at least one of said exposed corners.

4. The improvement called for in claim 3, wherein a portion of each of said exposed corners has openings on both sides and said means for selectively mounting said on-off switch comprises a pair of angle members which fit each of said exposed corners and cover said openings therein, and removable fastener means for securing said angle member to said exposed corner.

5. The improvement called for in claim 4, wherein both legs of one said angle member and one leg of the other said angle member have no opening therein and the second leg of said other angle member has at least one window therein in which said on-off switch may be mounted, and said fastener means allowing said angle members to be secured in inverted positions on said exposed corners.

6. In apparatus for brewing coffee or tea and having a body which includes, a base which incorporates a beverage beaker warmer, an upstanding hot water tank housing mounted on said base, and an upper housing mounted on said upstanding housing and a portion of which overhangs said warmer and a beaker when placed thereon and having a removable housing cover;

brewing funnel support means exteriorly mounted on the underside of said overhanging portion of said upper housing;

a hot water tank having a detachable cover and housed for the most part within said upstanding hot water tank housing and suspended therein from within said upper housing by detachable suspending means;

a cold water inlet tube mounted on said hot water tank cover and projecting downwardly into said hot water tank;

an electrically energized immersible heating element mounted on said hot water tank cover and projecting downwardly into said hot water tank;

a hot water discharge tube disposed within said upper housing and mounted in cantilever fashion on said detachable cover with its proximal and hot water inlet end communicating within the upper portion of said tank through said cover and with its distal and hot water discharge end protruding from the underside of said overhanging portion of said upper housing;

a spray head mounted on said protruding discharge end of said hot water discharge tube for spraying hot water into a brewing funnel when disposed on said brewing funnel support means;

an electrical connector cord for electrically energizing said apparatus from a power source and one end of which carries a connector plug and the other end of which extends into said body and provides a pair of electrically energizable conductors therein;

a bracket mounted on said tank cover and disposed within said upper housing;

a terminal block mounted on said bracket and having thereon a first pair of electrically interconnected terminals and having a second pair of electrically interconnected terminals;

a regulatable thermostat mounted on said bracket;

water temperature sensing means extending between the interior of said hot water tank and said thermostat and passing through an opening in said tank cover;

first conductors electrically interconnecting one of said pair of electrically energizable conductors in series with said first pair of terminals and one terminal of said water heating element; and second conductors electrically interconnecting the remaining one of said pair of electrically energizable conductors in series with said second pair of terminals, said thermostat and the remaining terminal of said water heating element;

the improvement which comprises, said hot water tank having a hot water outlet port in its side adjacent its upper end, disconnectible means for detachably suspending said hot water tank in one position in which said port is turned toward one sidewall of said upstanding hot water housing and in an alternate position in which said port is turned toward the opposite sidewall of said tank housing, each said sidewall having an opening therein for receiving therethrough a faucet inlet fitting and with which said port is aligned when said tank is in one of its alternate positions; and removal of said housing cover, detaching said tank cover from said hot water tank and detaching said tank suspending means from said hot water tank permitting said hot water tank to be rotated 180° to its alternate position.

7. The improvement called for in claim 6, wherein said detachable tank suspending means includes a flange on the upper end of said tank, flange supports mounted on said upper housing, and removable fasteners interconnecting said tank flange and flange supports, and wherein said detachable cover is detachably connected to said tank flange.

8. The improvement called for in claim 6, wherein a nipple fitting is mounted is said tank outlet port with the outer end of said fitting terminating within said tank housing and in alignment with one or the other of said openings in said tank housing sidewalls, and a removable plug extending through the adjacent sidewall opening and closing the end of said fitting and having a tool receiving portion disposed outside said tank housing and requiring removal before said tank can be rotated.

9. The improvement called for in claim 8, wherein a removable insert fits in and closes the one of said openings in said tank housing sidewalls not aligned with said nipple fitting.

10. In beverage brewing apparatus capable of operating either automatically or by cold water pour in and comprising, in combination, a cold water basin provided with both a drain opening therein and a fill opening through which a batch of cold water may be poured or dumped, a hot water tank under said basin, means for heating water is said tank, a first cold water tube having its upper inlet end connected to said drain opening and having its lower outlet end disposed in the lower portion of said hot water tank whereby cold water in said basin empties by gravity into the lower portion of said hot water tank, a cold water inlet line for supplying cold water to said hot water tank from a pressurized water supply, solenoid actuated valve means in said cold water inlet line for opening and closing said line to either allow cold water to flow through said cold water inlet line or prevent cold water from flowing through said line, timer means operatively associated with said solenoid actuated valve means for closing said valve means a predetermined time interval after each opening thereof allowing a predetermined quantity of cold water to flow each time said valve means is opened, a second cold water tube having its upper inlet end connected with said cold water inlet line on the downstream side of said valve means and having its lower outlet end disposed in the lower portion of said hot water tank, a hot water spray head, a siphon tube interconnecting said spray head with a hot water outlet opening adjacent the top of said hot water tank whereby hot water displaced by cold water entering the lower portion of said tank flows through said siphon tube to said spray head through which it discharges, and means for supporting a brewing funnel beneath said spray head; the improvement which comprises, said solenoid actuated valve means and said timer means being mounted on a module removably attached to said brewing apparatus, said cold water inlet line comprising a first section removably connected with said brewing. apparatus and with said valve means on its inlet side and a second section removably connected with said valve means on its outlet side and with said second cold water -tube, and said second cold water tube being removably mounted on said hot water tank.

11. In the brewing apparatus as called for in claim 10, a body in which said components of said apparatus are housed, said body having interior support means to which said module may be removably attached and having a removable panel providing an opening into said body through which said module may be inserted and removed.

* * * * *